E. BERLINER.
STABILIZING MECHANISM FOR FLYING MACHINES.
APPLICATION FILED JAN. 29, 1912.
1,119,567.
Patented Dec. 1, 1914.
2 SHEETS—SHEET 1.
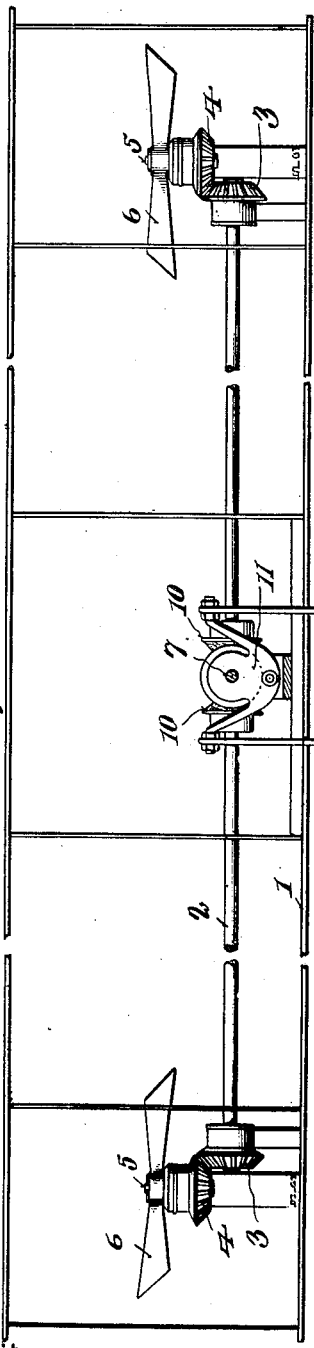
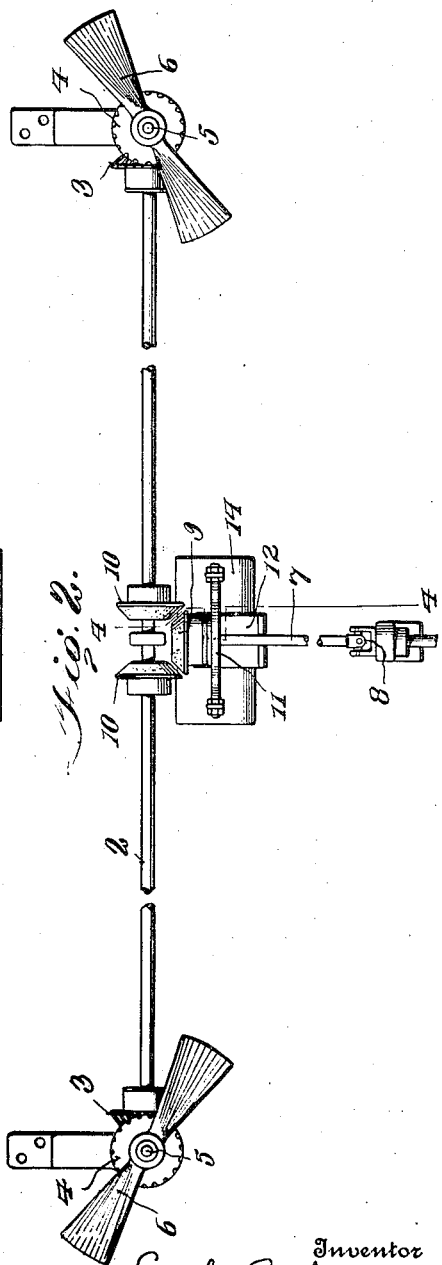
Witnesses
Inventor
Emile Berliner
By
Sturtevant & Mason
Attorneys

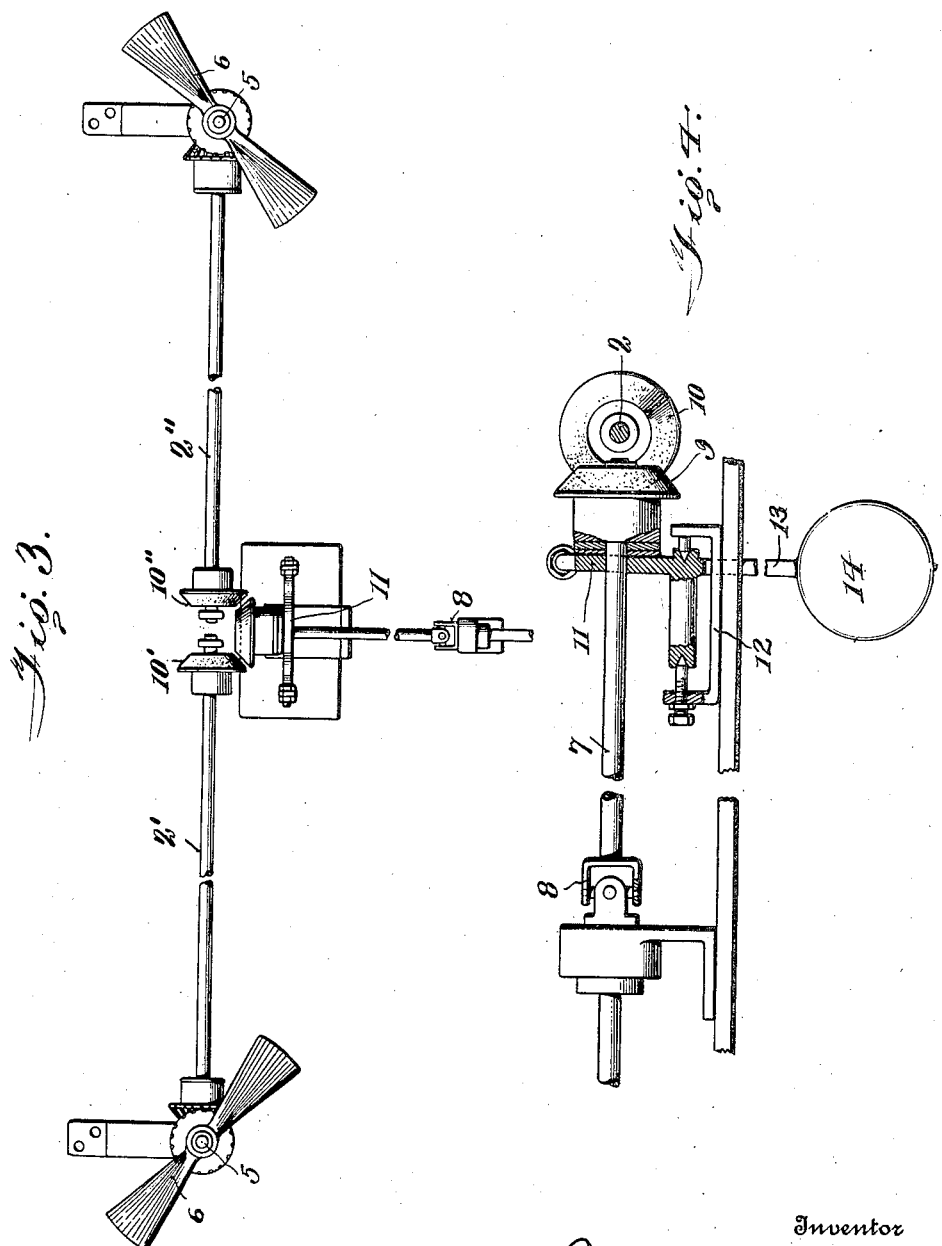

UNITED STATES PATENT OFFICE.

EMILE BERLINER, OF WASHINGTON, DISTRICT OF COLUMBIA.

STABILIZING MECHANISM FOR FLYING-MACHINES.

1,119,567. Specification of Letters Patent. Patented Dec. 1, 1914.

Application filed January 29, 1912. Serial No. 674,107.

*To all whom it may concern:*

Be it known that I, EMILE BERLINER, a citizen of the United States, residing at Washington, in the District of Columbia, have invented certain new and useful Improvements in Stabilizing Mechanism for Flying-Machines, of which the following is a description, reference being had to the accompanying drawing and to the figures of reference marked thereon.

My invention relates to improvements in flying machines, and particularly to a stabilizing device for aeroplanes and the like.

The object of the invention is to provide an effective device for automatically keeping an aeroplane in equilibrium, and it consists primarily in the use of stabilizing propellers arranged on opposite sides or ends of an aeroplane, said propellers being actuated by a shaft controlled by a pendulous weight to cause said shaft to operate or not operate said propellers.

It further consists in the use of stabilizing propellers at opposite sides or ends of an aeroplane capable of being operated reversely and in unison, or reversely and alternately or in any way so as to compress the air in opposite directions, by a shaft controlled by a pendulous weight to cause said shaft to operate or not operate said propellers.

Again the invention consists in the use of stabilizing propellers at opposite sides or ends of an aeroplane and connected to a common shaft in such a way that they may be turned forward or backward by the action of a second shaft, which is controlled by a pendulous weight to cause said shaft to operate or not operate said propellers.

Finally, the invention consists in the matters hereinafter described and referred to in the appended claims.

The invention is illustrated in the accompanying drawings, in which—

Figure 1 is an elevation of an aeroplane (biplane) showing my invention applied thereto; Fig. 2 is a plan view of the stabilizing mechanism; Fig. 3 is a view similar to Fig. 2, showing the propellers operated from separate driven shafts instead of being arranged on a common shaft, as in Fig. 2; and Fig. 4 is an elevation partly in section on line 4—4 of Fig. 2.

In these drawings, the numeral 1 represents in a conventional manner the supporting framework of a biplane, the operating mechanism, rudders, etc., not being necessary for an illustration of the present invention.

As shown in Fig. 1, a cross shaft 2 extends from side to side of the aeroplane, and at opposite ends has bevel gears 2, meshing with bevel gears 4 for driving vertical propeller shafts 5, carrying horizontal propellers 6 arranged to rotate in opposite directions. By this arrangement, as the propellers rotate, they compress the air in opposite directions, thus when in operation giving respectively a lifting and depressing effect. It will be obvious that the same result may be accomplished by rotating the propellers in the same direction, but making them respectively right and left hand. This cross shaft 2 is operated through the medium of a shaft 7 arranged at right angles thereto, and operated in any suitable manner. At one end said shaft is universally coupled at 8 to its driving connection, and at its opposite end carries a friction gear 9, normally out of engagement with the friction gears 10 on the shaft 2, but automatically brought into engagement with one or the other, as the aeroplane tilts one way or another.

The end of the shaft 7 adjacent the friction gear is supported in a yoke 11, pivoted as shown in detail in Fig. 4, to a bracket 12. Vertical arms 13 pivoted at their upper ends to the yoke, support between them at their lower ends a pendulous weight 14, which when the aeroplane is on even keel holds the yoke in horizontal position, and the shaft 7 with its friction gear 9 out of operative engagement with the shaft 2; but when the aeroplane tilts, the pendulous weight in retaining its plumb position will swing the yoke and carry the gear 9 into engagement with one or the other of the gears 10, and thus motion will be transmitted from shaft 7 to shaft 2, and the propellers operated to compress the air in opposite directions, and restore the equilibrium of the aeroplane.

As shown in Fig. 3, the shaft 2 is divided into two separate shafts 2', 2'', one carrying the gear 10' and the other the gear 10'', the propellers, therefore, by this arrangement, under the action of the shaft 7 operating independently and alternately, as the aeroplane tilts to one side or the other. It will be obvious that the pivoted shaft 7 may be continuously operated by connections to the motor shaft, or may be under the control of a clutch manipulated by the operator, or may be treadle-controlled, such details are not essential to my invention, the broad feature of which resides in the automatic throwing into and out of operation of a shaft which actuates stabilizing propellers, and the automatic engagement or disengagement of such shaft with the propellers being dependent on the efforts of a pendulous weight to remain plumb. Therefore, various modifications and changes may be made, without departing from the spirit of my invention.

Having thus described my invention, what I claim as new and desire to secure by Letters Patent, is:—

1. In an aeroplane, stabilizing propellers arranged upon opposite sides of the longitudinal center thereof, a shaft connecting said propellers so that said propellers compress the air in opposite directions when said shaft is rotated, and means for rotating said shaft in opposite directions, said means being controlled by a pendulous weight.

2. In an aeroplane, stabilizing propellers arranged upon opposite sides of the longitudinal center thereof, a shaft connecting said propellers so that the propellers compress the air in opposite directions when said shaft it rotated, a second shaft for rotating said first named shaft, devices whereby said first named shaft may be rotated in either direction from said second shaft, and means for controlling said devices including a pendulous weight, whereby the direction of rotation of the first named shaft is controlled by the tilting of the aeroplane.

3. In an aeroplane, stabilizing propellers arranged upon opposite sides of the center thereof, devices for rotating said propellers, including a rotating shaft formed in sections and flexibly connected together, a movable bearing for one end of said shaft, a pendulous weight connected to said movable bearing for moving the same upon the tilting of the aeroplane, and devices connected with said propellers and adapted to alternately engage said shaft.

In testimony whereof, I affix my signature in the presence of two witnesses.

EMILE BERLINER.

Witnesses:
A. M. PARKINS,
GRACE P. BRERETON.